(12) United States Patent
Kita et al.

(10) Patent No.: US 6,280,083 B2
(45) Date of Patent: Aug. 28, 2001

(54) THERMOCOUPLE LANCE WITH LAYERED SHEATH FOR MEASURING TEMPERATURE IN MOLTEN METAL

(75) Inventors: Hideki Kita; Takayuki Suzuki, both of Kanagawa-ken (JP)

(73) Assignee: Isuzu Ceramics Research Institute Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/750,626

(22) Filed: Dec. 28, 2000

Related U.S. Application Data

(62) Division of application No. 09/222,708, filed on Dec. 29, 1998, now Pat. No. 6,190,038.

(30) Foreign Application Priority Data

Jan. 12, 1998 (JP) .................................... 10-14745
Jan. 19, 1998 (JP) .................................... 10-20134

(51) Int. Cl.[7] .............. G01K 1/12; G01K 7/04; H01L 35/02
(52) U.S. Cl. ............ 374/140; 374/179; 136/234
(58) Field of Search ................ 374/179, 140, 374/139, 163, 208; 136/230, 232, 234; 219/205, 267

(56) References Cited

U.S. PATENT DOCUMENTS

| 3,607,446 | 9/1971 | Sugarman et al. | 136/230 |
| 3,614,387 | 10/1971 | Wrob et al. | 374/179 |

(List continued on next page.)

FOREIGN PATENT DOCUMENTS

| 0764837 | 3/1997 | (EP) . |
| 2154185 | 5/1973 | (FR) . |
| 2193376 | 2/1988 | (GB) . |
| 58-19524 | * 2/1983 | (JP) | 374/179 |
| 2-69627 | * 3/1990 | (JP) | 374/208 |
| 6-160200 | 6/1994 | (JP) . |

OTHER PUBLICATIONS

XP–002108016, Zhuchin et al., "Protective Sheath for Thermocouples Measuring the Temperature of Liquid Steel", Industrial Laboratory, vol. 50, No. 4, pp. 385–387, (Apr. 1984).

*Primary Examiner*—Diego Gutierrez
*Assistant Examiner*—Stanley J. Pruchnic, Jr.
(74) *Attorney, Agent, or Firm*—Browdy & Neimark

(57) ABSTRACT

[0081] A thermocouple lance for measuring temperatures in molten metals has a protective sheath of multi-layered structure that makes it possible to improve the life expectancy of repetitive measuring devices. The thermocouple lance has a protective sheath with one closed end and one opened end wherein porous heat-resisting ceramic filler is compacted. Embedded in the filler is a pair of W—Re alloy wires dissimilar in their composition from each other. The protective sheath has a layered structure made from cermet layers each having a molybdenum matrix and other layers of at least one boundary layer selected from the class consisting of C, MgO, CaO, $Al_2O_3$ and $ZrO_2$, the cermet layers and boundary layers overlapping each other in alternate layers. At least the outermost shell layer of the protective sheath is made of a cermet layer composed of any one of Mo—ZrN, Mo—$ZrB_2$, Mo—$ZrO_2$, Mo—ZrC and composite thereof. In one embodiment, a protective sheath is composed of layers in which are embedded filaments oriented predominantly in the circumferential direction of the sheath, and boundary layers which are provided between confronting surfaces of any adjoining filament-embedded layers, the boundary layer being weaker in bonding power than the filament-embedded layers. The filaments are of carbon or ceramic whereby the protective sheath may be enhanced in strength against the tensile stress that will occur due to the temperature difference in the protective sheath.

13 Claims, 5 Drawing Sheets

U.S. PATENT DOCUMENTS

| | | | |
|---|---|---|---|
| 3,647,558 | * 3/1972 | McMurtry | 374/140 |
| 4,060,095 | 11/1977 | Kurita | 136/234 |
| 4,135,538 | * 1/1979 | Kurita | 136/234 |
| 4,430,518 | * 2/1984 | Nakajima et al. | 374/139 |
| 4,721,533 | 1/1988 | Phillippi et al. | 374/208 |
| 4,749,416 | * 6/1988 | Greenspan | 374/140 |
| 4,796,671 | 1/1989 | Furishima et al. | 374/208 |
| 5,209,571 | 5/1993 | Kendall | 374/208 |
| 5,296,288 | * 3/1994 | Kourtides et al. | 428/262 |
| 5,360,269 | 11/1994 | Ogawa et al. | 374/208 |
| 5,388,908 | * 2/1995 | Kendall | 374/140 |
| 5,474,618 | * 12/1995 | Allaire | 374/179 |
| 5,663,899 | 9/1997 | Zvonar et al. | 374/179 |
| 5,696,348 | 12/1997 | Kawamura et al. | 136/234 |
| 5,709,474 | * 1/1998 | Richardson et al. | 374/140 |
| 5,750,958 | * 5/1998 | Okuda et al. | 219/267 |
| 5,811,761 | 9/1998 | Kita et al. | 374/208 |
| 6,040,519 | 3/2000 | Kita et al. | 136/230 |

* cited by examiner

THERMOCOUPLE LANCE WITH LAYERED SHEATH FOR MEASURING TEMPERATURE IN MOLTEN METAL

[0001] This is a division of parent application Ser. No. 09/222,708, filed Dec. 29, 1998, now U.S. Pat. No. 6,190,038.

BACKGROUND OF THE INVENTION

1. Field of Invention

[0002] The present invention relates to a thermocouple lance with a protective sheath suitable for measuring relatively high temperatures in molten metal baths of steel or the like.

2. Description of the Prior Art

[0003] Conventionally used for measuring a high temperature of about 1700° C. encountered in a molten steel bath are thermocouples made from wires of Pt—Rh alloy relatively high in melting point and stable in the atmosphere, the wires being fitted in a tubular sheath of alumino silicate fibers. The prior thermocouples are currently expensive as well as low in life expectancy of repetitive use because they are apt to become not capable of accurate temperature measurement and thus have to be disposed after only one or two measurements in the molten steel bath.

[0004] A type of the prior sheathed thermocouples has W—Re alloy wires that are enveloped in the metallic protective tubular sheath made of, for example, stainless steel so as to be adapted for use at high temperatures. Any such type of thermocouples with stainless steel protective sheaths has been designed to be used in atmospheres of above 1000° C. This protective sheath is usually produced from a special heat resisting alloy of, for example, Inconel which is a nickel-base alloy including chrome and iron. Another type of the prior thermocouples is well known in which the Pt—Rh wires are encapsulated in a protective tube of cermet.

[0005] Disclosed in Japanese Patent Laid-Open No. 160200/1994 is a sheathed thermocouple assembly hermetically sealed with a sealing plug, which may be free from errors in its measured temperature resulting from a temperature gradient occurring in the sealing plug owing to transient variations in temperature. The sheathed thermocouple assembly includes therein an alumel-chromel thermocouple consisting of two wires of different metals, or alumel and chromel. The two wires are contained in the stainless steel sheath together with inorganic insulating material electrically insulated from each other and further hermetically sealed at the open end of the sheath by means of the plug. The plug is provided in a ceramic end plate thereof with two tubes, which are made of Kovar, or iron-nickel-cobalt alloy, and coated on the inner surfaces thereof with electrically insulating sleeves. The two wires extend outside the sheath through tubes with no direct contact with their associated tubes.

[0006] On the other hand, the thermal shock resistance of the cermet-made protective sheath is 1.5 times of that of a $Si_3N_4$-made protective sheath. Moreover, the $Si_3N_4$-made protective sheath, when directly immersed into the molten steel bath above 1700° C., may crack in a relatively short interval after immersion resulting in breaking of the sheath.

[0007] It is to be noted that the Pt—Rh thermocouple may not be used in an inert-gas atmosphere and its permissible temperature limit in an environmental atmosphere is at 1500° C.

[0008] In contrast, the W—Re thermocouple may be used in any of inert-gas atmosphere and environmental atmosphere and its permissible temperature limit is at 400° C. in environmental atmosphere while at 2300° C. in inert-gas atmosphere.

[0009] The Pt—Rh thermocouple of platinum-rhodium alloy wires usually has a thermo-electromotive force that is $1/15$ times of that of the alumel chromel thermocouple while $1/7$ times of that of the W—Re thermocouple. Hence, the Pt—Rh thermocouple has a shortcoming in that it is inferior in accuracy as well as rapid response of the temperature measurement when compared with the other types of thermocouples.

[0010] In order to measure the temperature of the molten bath at the site of the furnaces by means of the prior thermocouples described above, the operator has consequently been compelled to stay near the furnaces for about eight seconds until the measured temperature becomes stable.

[0011] The prior thermocouples have a further disadvantage in which they are apt to be adhered to by molten metals so as to become deteriorated in rapid response of temperature measurement. This causes a collateral problem in which a troublesome process is inevitably required to remove iron or steel adhering to the Pt—Rh alloy wires and protective sheath of the thermocouple assembly. Another problem faced in using such thermocouples is the need to frequently replace the thermocouples because they are apt to become not capable of taking accurate temperature measurements after one or two uses in the molten steel bath. It is to be understood that the W—Re alloy wires for the thermocouples tend to be subjected to oxidation in environmental atmosphere so that they are not permitted to be used for measuring high temperatures in the molten iron for casting. The outer protective sheath is also disadvantageously apt to be adhered to by molten metals.

SUMMARY OF THE INVENTION

[0012] A primary object of the present invention is to overcome the shortcomings in the prior art as having been described above, and to improve the rapid response of the temperature measurement and the durability of the thermocouple. The present invention has for its object to provide a thermocouple lance for measuring high temperatures in molten metal baths, which comprises a thermocouple consisting of tungsten-rhenium alloy wires, and a protective sheath of a layered structure consisting of cermet layers, having a matrix of molybdenum which does not easily react with molten metal, and other layers high in thermal shock resistance. This makes it possible to provide the sufficient thermal shock resistance for the protective sheath and also to improve the life expectancy of repetitive measuring services.

[0013] Another object of the present invention is to provide a thermocouple lance for measuring high temperatures in molten metal baths, which has a protective sheath of layered structure, each layer of which includes therein filaments of heat resisting property, the filaments being arranged in the circumferential direction of the protective sheath, or in a direction along which may occur a thermal stress and a tensile stress, to thereby provide the sufficient thermal shock resistance for the protective sheath and also to provide the life expectancy of repetitive measuring services.

[0014] A further object of the present invention is to provide a thermocouple lance for measuring temperatures, in molten metals, comprising a protective sheath with one closed end and one opened end wherein a filler and a pair of temperature-measuring alloy wires are contained, there being only one pair of wires, the pair being composed of two wires of different alloys joined with each other at their confronting ends to form a junction where the temperature is to be measured, and the protective sheath being formed in a multi-layered structure of layers different in composition which are laid concentrically one on top of another in alternate layers.

[0015] As the temperature-measuring alloy wires are made of tungsten rhenium (W—Re) wires having a melting point of above 2300° C., the thermocouple lance having such wires kept hermetically from the atmosphere is endurable in heat resistance to the temperature in the molten steel bath for the steel making.

[0016] Another object of the present invention is to provide a thermocouple lance for measuring temperatures in molten metals, wherein the layered structure of the protective sheath is made from the layers of a molybdenum matrix and other layers of at least one material selected from the class consisting of C, MgO, CaO, $Al_2O_3$, and $ZrO_2$, the filler is of porous heat-resisting ceramics, and the protective sheath is hermetically closed at its open end by means of a sealing plug composed of dense heat-resisting substance and glass.

[0017] According to the present invention, the protective sheath has the multi-layered structure made of carbon, magnesia, calcia or the like, which is great in resistance force against molten metals. The protective sheath may be protected from the propagation in a straight line of cracks or breaks occurring in the outermost shell layer of the protective sheath owing to thermal shock. The propagation of the cracks in the protective sheath may be deflected under favor of the presence of the layers of C, MgO, CaO or the like whereby the energy may be dispersed which might otherwise cause the rupture of the thermocouple lance. This contributes to improvement in the strength as, well as the endurance of the protective sheath while making it possible to prolong the life expectancy of repetitive measuring services.

[0018] An additional object of the present invention is to provide a thermocouple lance for measuring temperatures in molten metals, wherein at least the outermost shell layer of the protective sheath is made of a cermet layer composed of any one of Mo—ZrN, Mo—$ZrB_2$ Mo—$ZrO_2$ Mo—ZrC and composite thereof, which has a low coefficient of thermal expansion and is unsusceptible to reaction with the molten metals. This composite outermost shell layer may keep the protective sheath from being stained by adherence of the molten metal, while improving the temperature measuring performance. Especially the cermet of molybdenum matrix has a melting point above 2000° C. and superior thermal shock resistance so that it is endurable to the thermal shock due to the high temperatures in molten metals.

[0019] Another object of the present invention is to provide a thermocouple lance for measuring temperatures in molten metals, wherein the filler of porous heat resisting ceramics is composed of reaction-sintered silicon nitride with the addition of Ti. It is to be understood that the reaction-sintered silicon nitride added with Ti undergoes no burning shrinkage and therefore causes no clearance near the inner surface of the protective sheath as well as around the W—Re wires, resulting in an improvement in the endurance of the thermocouple lance.

[0020] A further object of the present invention is to provide a thermocouple lance for measuring temperatures in molten metals, wherein the filler of porous heat resisting ceramics is composed of a mixture of heat resisting ceramic powder with inorganic substance converted from organosilicon polymer containing therein $Si_3N_4$ powder.

[0021] Another object of the present invention is to provide a thermocouple lance for measuring temperatures in molten metals, wherein the mixture contains therein at least one of carbon and boron nitride (BN). It will be thus understood that oxygen contained in the mixture does not oxidize the tungsten-rhenium alloy wires, but oxidizes carbon or boron nitride to generate a gaseous substance, which remains in the porous heat resisting ceramics whereby the tungsten-rhenium alloy wires are kept from oxidation while the thermocouple junction may be improved in durability.

[0022] A further object of the present invention is to provide a thermocouple lance for measuring temperatures in molten metals, wherein the filler of porous heat resisting ceramics contains Zr, O, Al and P.

[0023] In the thermocouple lance for measuring temperatures in molten metals according to the present invention, as described above, the protective sheath is formed in the multi-layered structure, which may arrest the straight propagation of the cracks occurring due to the thermal shock, and deflect the crack propagation at the boundary layers therein. This structure requires greater energy to rupture and therefore is difficult to damage with the result of prolonging the endurance of the protective sheath.

[0024] In addition, on the thermocouple lance for measuring temperatures in molten metals according to the present invention, as described above, the protective sheath has the layered structure made from the cermet layers having a molybdenum matrix, and other layers of at least one selected from the class consisting of C, MgO, CaO, $Al_2O_3$ and $ZrO_2$, both of which layers overlap each other in alternate layers. This feature makes the protective sheath unsusceptible to adhering molten metals onto the surface of the thermocouple lance while stopping the straight propagation of the cracks inside the protective sheath, so that the thermocouple lance makes it possible to measure the temperatures in the molten metals with accuracy as well as quickness, over 500 cycles of repetitive temperature-measuring, resulting in improvement in durability and life expectancy.

[0025] In the thermocouple lance for measuring temperatures in molten metals according to the present invention, moreover, the hot temperature in the molten metals may be confined in the temperature-measuring zone at the thermocouple hot junction because the filler in the protective sheath is of porous ceramics which is rich in porosity to make the thermal conductivity low. This makes it possible to arrest the heat conduction backward from the temperature-measuring zone immersed in the molten metal baths, so that the thermocouple lance may be improved in the rapid response of the temperature measurement.

[0026] Another object of the present invention is to provide a thermocouple lance for measuring temperatures in molten metals, wherein filaments are embedded in a solid material of each layer of the multi-layered structure for the protective sheath, the filaments being oriented predominantly in the circumferential direction of the sheath, and boundary layers being interposed between confronting surfaces of any adjoining filament-embedded layers, the boundary layer being made of a material that is weaker in bonding power than the solid material of the filament embedded layer.

[0027] A further object of the present invention is to provide a thermocouple lance for measuring temperatures in molten metals, wherein the layers of the protective sheath are each composed of any one of ceramics and a composition of ceramics and carbon.

[0028] An additional object of the present invention is to provide a thermocouple lance for measuring temperatures in molten metals, wherein the layers of the protective sheath are each made of cermet that is composed of ceramics and a metal of any one of Mo and W. The layers in the multi-layered structure of the protective sheath are each made of a substance that is composed of a Mo-based material dispersed with $ZrO_2$ or the like, for example, Mo—$ZrO_2$, which substance has a low coefficient of thermal expansion and is resistant to reaction with molten metals. The protective sheath is thus kept from adhering to the molten metals, to thereby help ensure the repetitive measuring services and the improved temperature measurement performance.

[0029] A further object of the present invention is to provide a thermocouple lance for measuring temperatures in molten metals, wherein the filaments oriented in the layers of the protective sheath are of any one of carbon filaments and ceramic filaments.

[0030] A further object of the present invention is to provided a thermocouple lance for measuring temperatures in molten metals, wherein the carbon filaments are coated with at least any one of Mg, CaO, $ZrO_2$ and $Al_2O_3$.

[0031] Another object of the present invention is to provide a thermocouple lance for measuring temperatures in molten metals, wherein the boundary layers are each composed of any one of carbon and boron nitride (BN).

[0032] In the ceramic thermocouple lance for measuring temperatures in molten metals as described just above, the filaments are embedded in the layers in the multi-layered structure of the protective sheath while oriented in the perimetral direction of the sheath. As a result, the cracks caused by the thermal shock do not advance directly to the interior of the protective sheath, but propagate in a deflected condition at carbon filaments as well as the boundary layers whereby this structure requires the greater energy of rupture and therefore is hard to be damaged with the improvement in the endurance of the thermocouple lance.

[0033] As described above, in a thermocouple lance for measuring temperatures in molten metals according to another aspect of the present invention, the heat resisting filaments are embedded in a solid material of each layer of the multi-layered structure, the filaments being oriented predominantly in the circumferential direction of the sheath, and boundary layers are interposed between confronting surfaces of any adjoining filament-embedded layers, the boundary layer being made of a material that is weaker in bonding power than the solid material of the filament-embedded layer. This feature of the present invention contributes to the enhancement of the thermal shock resistance during the temperature measurement in the molten metals. The propagation of the cracks is deflected at the filaments as well as the boundary layers and cannot reach the filler packed in the protective sheath. This makes it possible to measure the temperatures in the molten metals with accuracy as well as quickness during more than 500 cycles of the repetitive temperature-measuring works, resulting in improving the durability and life expectancy.

[0034] Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

BRIEF DESCRIPTION OF DRAWING

[0035]

[0036]

[0037]

[0038]

[0039]

[0040]

[0041]

[0042]

DETAILED DESCRIPTION OF THE PREFERRED EMBODIMENTS

Figure 1:
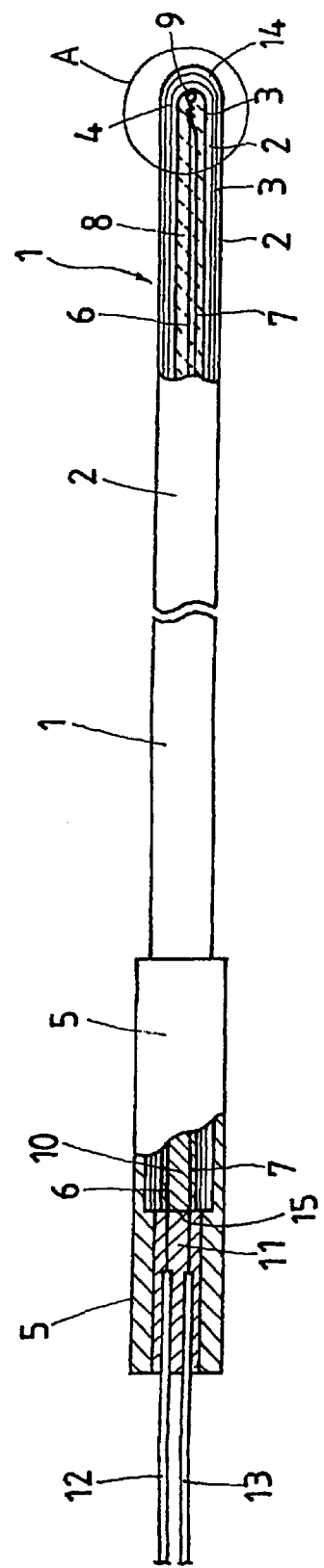
FIG. 1 is a side view in elevation, partially in section, of a first preferred embodiment of a thermocouple lance for measuring temperatures in molten metal baths according to the present invention.
Figure 2:
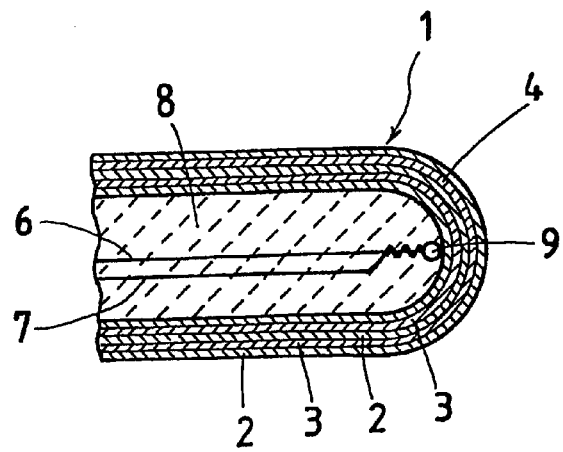
FIG. 2 is a fragmentary enlarged sectional view of a distal end of the thermocouple lane in FIG. 1, the view being taken on the circle A of FIG. 1.

[0043] Described below in detail with reference to FIGS. 1 and 2 will be a first preferred embodiment of a thermocouple lance for measuring temperatures in molten metal baths according to the present invention.

[0044] The thermocouple lance is provided with a protective sheath 1 that is formed in a layered structure at a distal section thereof. The distal section will be referred to as a temperature-measuring zone, which is to be immersed into molten metals. The layered structure of the protective sheath 1 is comprised of an outermost shell layer made of cermet layers 2 having a molybdenum matrix, and other layers 3 inside the shell layer composed of at least one selected from the class consisting of C, MgO, CaO, $Al_2O_3$ and $ZrO_2$, the cermet layers 2 and other layers 3 being overlaid with each other in from twenty to fifty layers. In other words, the protective sheath 1 has the layered structure made from the cermet layers 2 of a molybdenum matrix, and other layers 3 of at least one selected from the class consisting of C, MgO, CaO, $Al_2O_3$, and $ZrO_2$, both of which layers overlap each other in alternate layers.

[0045] The thermocouple lance of the present invention primarily comprises the protective sheath 1 having the cermet layers 2 and other layers 3 overlap each other in alternate layers, a filler 8 compacted in the protective sheath 1, and a pair of temperature-detecting wires, or thermocouple wires 6, 7 of alloys different in composition from each other. The compacted filler 8 is of porous heat-resisting ceramics while the protective sheath 1 is closed at its opened end by means of a sealing plug 10, which is composed of dense heat-resisting substance and glass. The protective sheath 1 is closed at its distal end 14 for the temperature-measuring zone, which is to be immersed into molten metals. The protective sheath 1 is also open at its opposite end 15 on which is mounted a sealing tube 5 of stainless pipe.

[0046] The outermost shell layer of the protective sheath 1 is directly exposed to molten metals when immersed in molten metals. Hence, the shell layer should be made of the cermet layer 2 composed of any one of Mo—ZrN, Mo—ZrB$_2$, MO—ZrO$_2$, Mo—ZrC and composite thereof, which has a low coefficient of thermal expansion and hard to be subjected to the reaction with molten metals.

[0047] The thermocouple wires 6, 7 are of tungsten-rhenium alloys, one 6 of which wires has the composition of W—5Re while other wire 7 has the composition of W—26Re. Both the W—5Re wire 6 and W—26Re wire 7 are arranged in the protective sheath 1 in spaced relation from each other and buried in the filler 8 compacted in the protective sheath 1. The W—5Re wire 6 and W—26Re wire 7 are joined with each other at their confronting ends to form the hot junction 9 wherein the temperature is to be measured. The opposite ends of the W—5Re wire 6 and W—26Re wire 7 extend outwardly from the sheath through the sealing plug 10 at the open end of the protective sheath 1 into ceramic cement 11 filled in the sealing pipe 5 that is mounted on the open end of the protective sheath 1. The wires in the ceramic cement 11 are connected with terminals 12, 13 through, for example, leads or cold-junction compensation in the tubes made of kovar. The sealing pipe 5 constitutes a kind of supporting ring.

[0048] The filler 8 is porous heat resisting ceramics composed of a mixture of heat resisting ceramic powder with any one of reaction-sintered silicon nitride with the addition of $T_i$ and an inorganic substance converted from organosilicon polymer, especially, polycarbosilane, containing therein Si$_3$N$_4$ powder. For the filler 8 composed of the mixture of the heat resisting ceramic powder with the inorganic substance, it is preferred the mixture contains therein at least one of carbon and boron nitride (BN). The porous heat resisting ceramics for the filler 8 are recommended to contain Zr, O, Al and P. It is to be noted that the filler compacted in the protective sheath 1 is formed in the porous or cellular structure of a substance such as reaction sintered Si$_3$N$_4$ ceramics, which is made less in the thermal conductivity. The filler 8, for instance, may have such structure that is rich in porosity to make the thermal conductivity less, thereby rendering the temperature-measuring zone 4 of the protective sheath 1 low in thermal capacity. This makes it possible to stop the heat conduction flowing backward from the temperature-measuring zone 4 while immersed in the molten metal baths, so that the thermocouple lance may be improved in the rapid response of the temperature measurement.

[0049] The protective sheath 1 of the layered structure is superior in the thermal shock as well as corrosion resistances. That is, the multi-layered structure may retard the propagation of cracks which have occurred in the outermost shell layer due to the thermal shock, so that the lethal rupture may be avoided that might otherwise occur in the protective sheath having the conventional ceramic shell. In addition, since the outermost shell layer of the protective sheath 1 is made of the cermet layer 2 having the molybdenum matrix, the protective sheath 1 is kept from being adhered to by the molten metal, to thereby help ensure the repetitive measuring services. As an alternative, the protective sheath 1 may be filled with inert gas such as N$_2$ and Ar together with the filler 8 and hermetically closed by the sealing plug 10 fitted in the open end of the protective sheath 1.

[0050] The following examples serve to illustrate the preferred method of producing the thermocouple lance of the present invention.

EXAMPLE 1

[0051] By the use of a doctor blade for the fabrication of green tapes, sheets 100$\mu$ in thickness were first formed from the cermet, or Mo—ZrO$_2$, Mo—ZrN, Mo—ZrB$_2$ and Mo—ZrC, having the molybdenum matrix. These sheets were then sprayed on one side by a powder of any one of carbon (C), magnesia (MgO) and calcia (CaO). The sheets were wound up around a stainless steel-made mandrel with one end being closed and then brought into an elastic mould in which the wound sheets were made more compact under the application of high pressure by means of cold isostatic pressing, resulting in the integrated product. The product, when released from the compressive force after completion of cold isostatic pressing, expanded slightly owing to its springy restoration so as to be drawn out of the mandrel. The product was subjected to a debinding process, after which the product was burned in hydrogen atmosphere, forming the protective sheath of multi-layered structure with one closed and one opened end. While a pair of two wires of dissimilar metals, or W—Re5 wire 6 and W-Re26 wire 7 of 0.2 mm in diameter, 200 mm long, was jointed by welding at their confronting ends to thereby provide the temperature-measuring junction, or hot junction 9.

[0052] Thereafter, the protective sheath 1 was filled with a solution of organosilicon polymer, especially, polycarbosilane, containing therein Si$_3$N$_4$ powder, and the W—Re wires 6, 7 joined together at their one ends were inserted in the protective sheath 1 to a place where the junction comes close to the closed end of the protective sheath 1. The protective sheath 1 was then closed at its open end by means of the sealing plug 10 of dense glass (B$_2$O$_3$—ZnO). It will be noted that the protective sheath 1 may be filled with an inert gas, for example, Ar or N$_2$, prior to closure with the sealing plug 10. Finally, the stainless holder tube, or sealing tube 5, was secured on the plugged end of the protective sheath 1 by means of a collet chuck or the like to thereby finish the thermocouple lance shown in FIG. 1.

EXAMPLE 2

[0053] The thermocouple lance was produced by the manufacturing method substantially identical with the method described above in Example 1, except that the filler 8, prior to being charged into the protective sheath 1, was mixed with 5% of carbon and 5% boron nitride (BN) to adjust its composition so as to keep the W—Re wires 6, 7 from oxidation. That is, it is true that the added carbon and boron nitride (BN) in the filler 8 may predominantly react with oxygen in the filler 8 while protecting the W—Re wires 6, 7 from the oxidation with the result the W—Re wires 6, 7 may be improved in durability.

EXAMPLE 3

[0054] The thermocouple lance was produced by the manufacturing method substantially identical with the method described above in Example 1, except that the filler 8 to be packed in the protective sheath 1 was of a paste composed of zirconia, aluminum phosphate and aluminum hydroxide. It is to be understood that the paste of the composition described above may solidify into a heat resisting substance with the dehydrating reaction taking place therein.

[0055] In the following we have described the results of temperature measurements in the molten metals of about 1750° C., which we have carried out by use of the thermocouple lances produced in the Examples 1, 2 and 3 described above.

[0056] The thermocouple lances required about 10 seconds of an interval for effecting stabilization or equilibrium in the measured temperatures. The thermocouple lances were found to be sufficiently durable for measuring the temperatures in the molten metals, even after over 500 cycles of the repetitive temperature-measuring service in molten metals at about 1750° C. We found the life expectancy of the thermocouple lances was actually at 521 cycles of repetitive services. We further observed that the thermocouple lances, after repetitive exposure to the molten metals, had cracks in the protective sheath. Nevertheless, the cracks were found to propagate in a deflected condition at carbon layers, but cease in the layered structure without reaching the interior of the protective sheath.

[0057] For comparison, we prepared a protective sheath of monolithic structure other than the layered structure and produced a reference thermocouple lance having the monolithic protective sheath. The monolithic protective sheath was made of Mo—$ZrO_2$ cermet. We have carried out, like the above, the temperature measurement in the molten metals of about 1750° C. by use of the reference thermocouple lance. The result showed the reference thermocouple lance had cracks in only ten of the repetitive measuring services. We found the life expectancy of the reference thermocouple lance was actually at twelve cycles of repetitive services. We further observed that the cracks propagated to the interior of the protective sheath, or the filler in the sheath. This made it impossible to further measure the temperatures in the molten metals.

[0058] Next, a second embodiment of the thermocouple lance for measuring temperatures in molten metal baths according to the present invention will be explained with reference to FIGS. 3 to 8.

[0059] This thermocouple lance, as apparent from FIGS. 3 to 8, comprises a protective sheath 21 of multi-layered structure with one closed and one opened end wherein a filler 25 and a pair of temperature measuring alloy wires 26, 27 are contained. The temperature-measuring wires 26, 27 consist of two wires of different metal alloys in composition, the wires being embedded with the filler 25 and joined together at their confronting ends to form a thermocouple junction placed where the temperature is to be measured. The protective sheath 21 is composed of plural cermet layers 22 each having a molybdenum matrix, the layers 22 being arranged in concentric relation with each other to form a layered structure. Embedded in a solid material of each layer 22 of the protective sheath 21 made less in the thermal conductivity. The filler 8, for instance, may have such structure that is rich in porosity to make the thermal conductivity less, thereby rendering the temperature-measuring zone 4 of the protective sheath 21 less in thermal capacity. This makes it possible to arrest the heat conduction backward from the temperature-measuring zone 4 immersed in the molten metal baths, so that the thermocouple lance may be improved in the rapid response of the temperature measurement.

[0060] The protective sheath 21 of the layered structure is superior in the thermal shock as well as corrosion resistances. That is, the multi-layered structure may retard the propagation of cracks which have occurred in the outermost shell layer of heat resisting carbon filaments 24 and ceramic filaments. The carbon filaments 24 are coated with at least any one of Mg, CaO, $ZrO_2$ and $Al_2O_3$, so as to be protected against oxidation. In addition, the boundary layers 23 are composed of any one of carbon and boron nitride (BN).

[0061] The thermocouple lance according to the second embodiment of the present invention comprises the protective sheath 21 of multi-layered structure wherein the cermet layers 22 and other layers 23 overlap each other in alternate layers, the protective sheath 21 being open at its one end and closed at its lengthwise opposite end where the temperatute-measuring zone 28, the filler 25 of porous heat resisting ceramics compacted in the protective sheath 21, a pair of temperature-measuring alloy wires 26, 27 consisting of two wires of different metal alloys in composition, the wires being embedded with the filler 25 in the protective sheath 21, the sealing plug at the open end of the protective sheath 21 composed of a dense heat resisting member and a glass, and the stainless-made sealing pipe 5 mounted on the open end of the protective sheath 21.

[0062] The cermet layers 22 of the protective sheath 21 constitute at least the outermost shell layer exposed directly to the molten metals and therefore are comprised of any one of Mo—ZrN, Mo—$ZrB_2$, Mo—$ZrO_2$, Mo—ZrC and composites thereof, which have a low coefficient thermal expansion and do not easily react with molten metals.

[0063] The thermocouple wires 26, 27 are of tungsten-rhenium alloys, one 26 of which wires has the composition of W—5Re while the other 27 has the composition of W—26Re. Both the W—5Re wire 26 and W—26Re wire 27 are arranged in the protective sheath 21 in spaced relation from each other and buried in the filler 25 compacted in the protective sheath 21. The W—5Re wire 26 and W—26Re wire 27 are joined with each other at their confronting ends to form the hot junction 29 where the temperature is to be measured. The opposite ends of the W—5Re wire 26 and W—26Re wire 27 extend outwardly of the sheath through the sealing plug, not shown, at the opened end of the protective sheath 21 into ceramic cement filled in the sealing pipe that is mounted on the opened end of the protective sheath 21. The wires in the ceramic cement are connected with terminals through, for example, leads or cold-junction compensation in the tubes made of kovar. The sealing pipe constitutes a kind of supporting ring.

[0064] The filler 25 is porous heat resisting ceramics composed of a mixture of heat resisting ceramic powder with any one of reaction-sintered silicon nitride with the addition of Ti and inorganic substance converted from organosilicon polymer, especially polycarbosilane, containing therein $Si_3N_4$ powder. For the filler 25 composed of the mixture of the heat resisting ceramic powder with the inorganic substance, it is preferred the mixture contains therein at least one of carbon and boron nitride (BN). The porous heat resisting ceramics for the filler 25 are recommended to contain Zr, O, Al and P. It is to be noted that the filler 25 compacted in the protective sheath 21 is formed in the porous or cellular structure of a substance such as reaction sintered $Si_3N_4$ ceramics, which is made less in the thermal conductivity.

[0065] The protective sheath 21 of the layered structure is superior in the thermal shock as well as corrosion resistance. That is, the multi-layered structure may retard the propagation of cracks which have occurred in the outermost shell layer due to the thermal shock, so that the lethal rupture may be avoided that might otherwise occur in the protective sheath 21 having the conventional ceramic shell. In addition, since the outermost shell layer of the protective sheath 21 is made of the cermet layer 22 having the molybdenum matrix, the protective sheath 21 is kept from being adhered by the molten metal 28, to thereby help ensure repeated usage. The following examples serve to illustrate the preferred method of producing the thermocouple lance of the present invention.

[0066] The following discloses about how fabricate the thermocouple lance for measuring the temperatures in the molten metals according to the second embodiment of the present invention.

Figure 3:
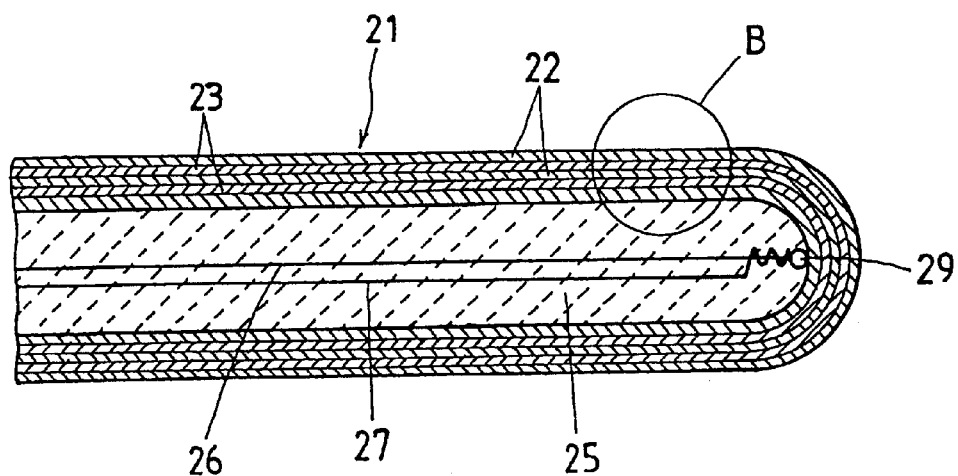
FIG. 3 is a fragmentary enlarged sectional view showing a second embodiment of a thermocouple lance for measuring temperatures in molten metal baths according to the present invention.
Figure 4:
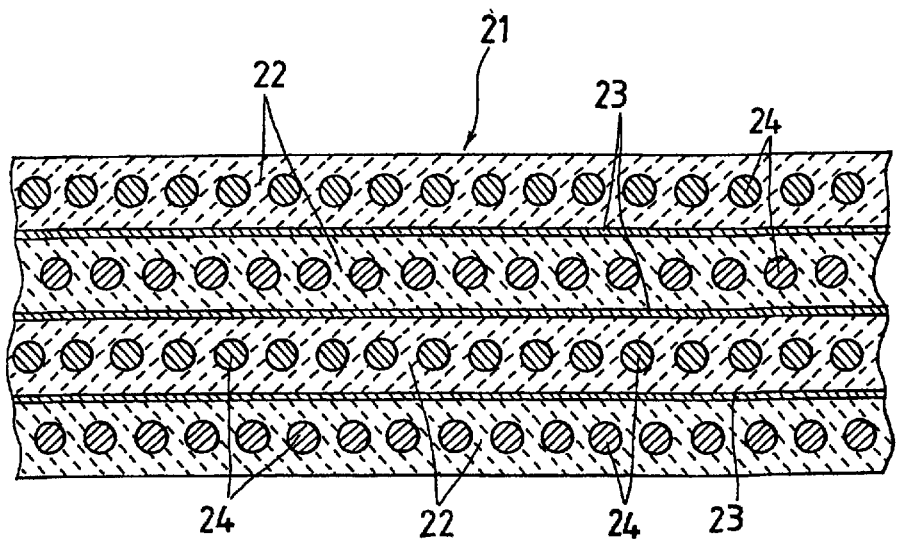
FIG. 4 is a fragmentary enlarged sectional view illustrating a layered structure of a protective sheath in FIG. 3, the view being taken on the circle B in FIG. 3.
Figure 5:
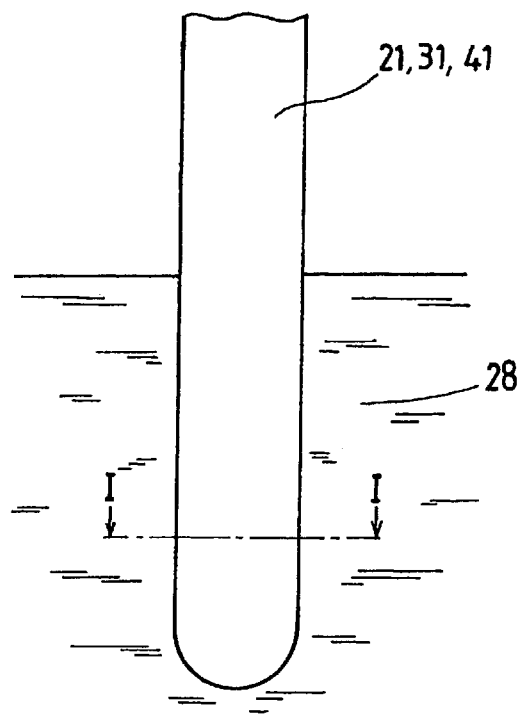
FIG. 5 is a schematic view illustrating a thermocouple lance immersed into molten metals.
Figure 6:
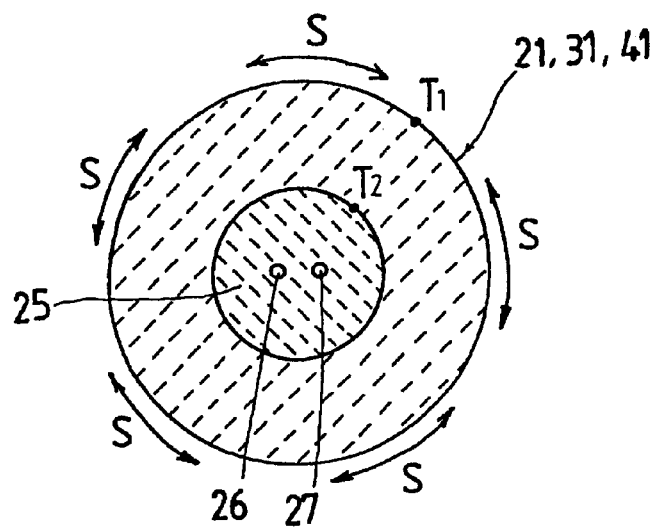
FIG. 6 is an enlarged cross-sectioned view for explaining the crack-occurring principle in the protective sheath of the thermocouple lance shown in FIG. 5, the view being taken on the plane of the line I—I of FIG. 5.

[0067] By the use of doctor blade method for the fabrication of the green tapes, the sheets were first formed of the cermet, or Mo—$ZrO_2$, Mo—ZrN, Mo—$ZrB_2$ and Mo—ZrC, having the molybdenum matrix. The carbon filaments 24 were coated with at least any one of Mg, CaO, $ZrO_2$ and $Al_2O_3$ so as to be kept from the oxidation. Then, the carbon filaments 24 were arranged on the sheets while oriented in a predetermined direction. The sheets of Mo—$ZrO_2$ were laid one on top of another. We thereafter wound the piled sheets around a stainless steel-made mandrel while spraying graphite powder inside the piled sheets to thereby form a tubular member of multi-layered structure. The tubular member was closed at its lengthwise one end and charged in an elastic mould in which the tubular member underwent the secondary molding under the cold isostatic pressing so as to be formed into a densified, integrated tubular product. The product, after being subjected to debinding process, was burned in hydrogen atmosphere at 1800° C., forming the protective sheath 21 of multi-layered structure with one closed end and one opened end. FIGS. 3 to 4 show the protective sheath 21 fabricated as described above.

[0068] While a pair of two wires of dissimilar metals, or W—Re5 wire 26 and W—Re26 wire 27 of 0.2 mm in diameter, 220 mm long, was jointed by welding at their confronting ends to thereby provide the temperature-measuring junction, or hot junction 29.

[0069] Next, the protective sheath 21 was filled with a solution of organosilicon polymer, especially, polycarbosilane, containing therein $Si_3N_4$ powder, and the W—Re wires 26, 27 Joined together at their one ends were inserted in the protective sheath 21 to a place where the junction comes close to the closed end of the protective sheath 21. The protective sheath 21 was then closed at its open end by means of the sealing plug of dense glass ($B_2O_3$—ZnO). Finally, the stainless holder tube, or sealing tube, was secured on the plugged end of the protective sheath 21 by means of a collet chuck or the like to thereby finish the thermocouple lance.

[0070] As an alternative, the thermocouple lance was produced by a manufacturing method substantially identical with the method described above, except that the filler 25, prior to being charged into the protective sheath 21, was mixed with each of 5% of carbon and 5% boron nitride (BN) to adjust its composition so as to be capable of keeping the W—Re wires 26, 27 from the oxidation. That is, it is true that the added carbon and boron nitride (BN) in the filler 25 may predominantly react with oxygen in the filler 25 while protecting the W—Re wires 26, 27 from oxidation with the result the W—Re wires 26, 27 have improved durability.

Figure 8:
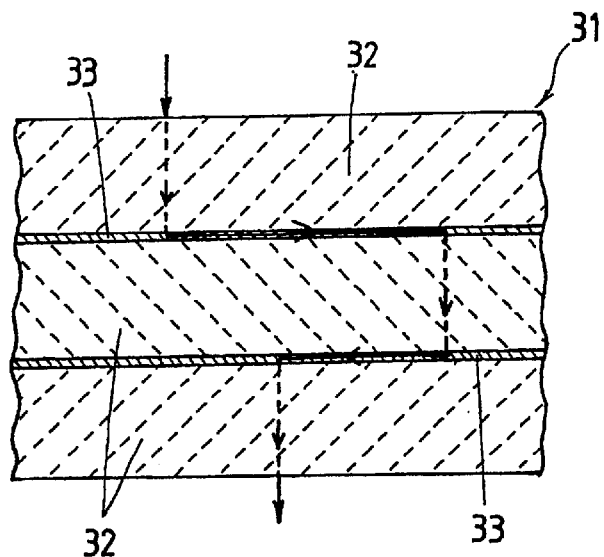
FIG. 8 is a fragmentary enlarged view for explaining the propagation of the crack that might occur in the protective sheath of layered structure.
Figure 9:
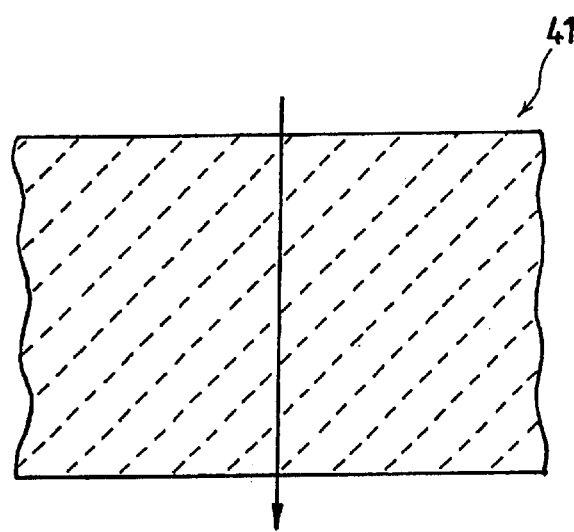
FIG. 9 is a fragmentary enlarged view for explaining the propagation of the crack occurring in the protective sheath of monolithic structure.

[0071] For comparing the protective sheath 21 in FIG. 4 according to the present invention with the other structures of the protective sheaths, we fabricated both of a protective sheath 31 in FIG. 8 of the multi-layered structure formed of the Mo—$ZrO_2$ layers 32 and the boundary layers 33 and a protective sheath 41 in FIG. 9 of the Mo—$ZrO_2$ monolithic structure.

[0072] In the following we have described the results of temperature measurements in the molten metals of about 1750° C., which we have carried out using thermocouple lances having the protective sheaths 21 and 31, respectively.

[0073] We found the thermocouple lance having the protective sheath 31 in FIG. 8 was damaged at about 300 cycles of the repetitive temperature-measuring works in the molten metals. We observed that the thermocouple lances, after repetitive exposures to the molten metals, had cracks in the protective sheath 31. Nevertheless, the cracks were found to propagate in a deflected pattern 33, as shown in FIG. 8, at the boundary layers for the layered structure whereby the life expectancy of the thermocouple lances was improved in the number of cycles of the repetitive temperature-measuring works as compared with the protective sheath 41.

[0074] In contrast, the thermocouple lance having the protective sheath 41 in FIG. 9 had cracks at just only about 20 cycles of the repetitive temperature-measuring services. We further observed that the cracks propagated to the interior of the protective sheath in a straight line as shown with an arrow in FIG. 9.

[0075] The thermocouple lance with the protective sheath 21 in FIG. 4 was found to be still sufficiently durable for measuring the temperatures in the molten metals, even after about 800 cycles of the repetitive temperature-measuring services. We further observed that the thermocouple lances, after repetitive exposures to the molten metals, had cracks in the protective sheath 21. Nevertheless, the cracks were found to propagate in a deflected condition at carbon filaments 24 as well as the boundary layers 23 due to the multi-layered structure with the wound carbon filaments. Hence, we found the crack propagation was repressed whereby the life expectancy of the thermocouple lances was improved over both the protective sheaths 31, 41 in the number of cycles of the repetitive temperature-measuring work.

[0076] If the thermocouple lance with any one of the protective sheaths 31, 41 is immersed into the molten metals, the protective sheaths 31, 41, may undergo the increased temperature difference $\Delta T(T_1-T_2)$, in which $T_1$ is the temperature of the outer surface area of the protective sheath exposed to the molten metals, and $T_2$ is the temperature of the inner area of the protective sheath. This increased temperature difference causes a tensile stress S along the perimeter of the sheath, which stress is the origin of the cracks occurring in the protective sheath.

Figure 7:
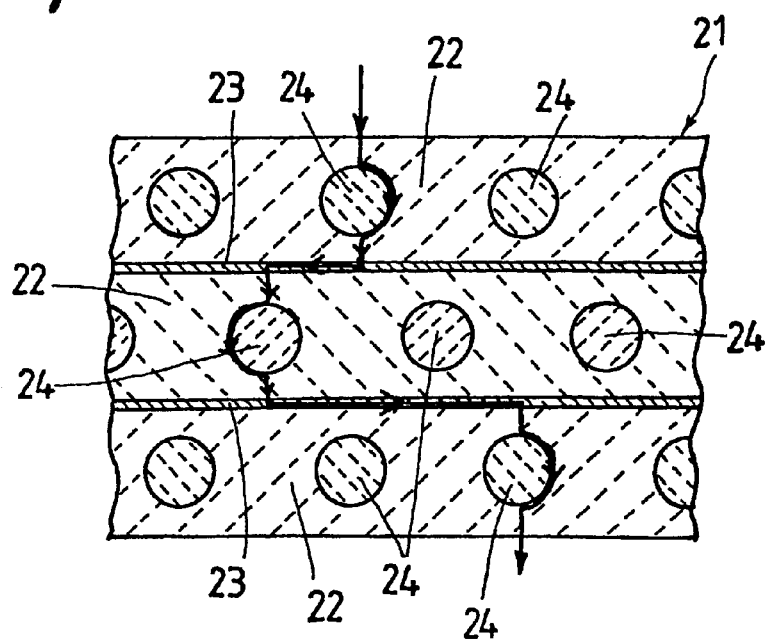
FIG. 7 is a fragmentary enlarged view for explaining the propagation of the crack that might occur in the protective sheath in FIG. 4.

[0077] On the contrary, the protective sheath 21 of the thermocouple lance according to the present invention is provided with the carbon filaments 24 embedded in the layers 22 while oriented in the direction along which generates the tensile stress S as shown in FIGS. 4 and 7. As a result, the protective sheath 21 is enhanced, when immersed into the molten metals 28, in yield strength against the tensile stress S that will happen owing to the temperature difference occurring in the sheath itself. The cracks in the protective sheath 21 were found to propagate in a deflected condition at carbon filaments 24 as well as the boundary layers 23 so that the crack propagation was really repressed whereby the endurance of the protective sheath 21 was improved remarkably. The tubular member was closed at one of its lengthwise ends and charged in an elastic mold in which the tubular member underwent the secondary molding under the cold isostatic pressing so as to be formed in a densified, integrated tubular product. The product, after being subjected to debinding process, was burned in hydrogen atmosphere at 1800° C., forming the protective sheath 21 of multi-layered structure with one closed end and one open end. FIGS. 3 to 4 show the protective sheath 21 fabricated as described above.

[0078] While a pair of two wires of dissimilar metals, or W—Re5 wire 26 and W—Re26 wire 27 of 0.2 mm in diameter, 220 mm long, was jointed by welding at their confronting ends to thereby provide the temperature-measuring junction, or hot junction 29.

[0079] Next, the protective sheath 21 was filled with a solute was really repressed whereby the endurance of the protective sheath 21 was improved remarkably.

[0080] It should be understood that the foregoing relates to only preferred embodiments of the present invention, and that is intended to cover all changes and modifications of the examples of the invention herein chosen for the purposes of the disclosure, which do not constitute departure from the spirit and scope of the invention.

What is claimed is:

1. A thermocouple lance for measuring temperatures in molten metals, comprising a protective sheath with one closed end and one opened end wherein a filler and a pair of temperature-measuring alloy wires are contained, there being only one pair of wires, the pair being composed of two wires of different alloys joined with each other at their confronting ends to form a junction where the temperature is to be measured, and the protective sheath being formed in a multi-layered structure of layers different in composition and laid concentrically one on top of another in alternate layers, wherein filaments are embedded in a solid material of each layer of the multi-layered structure for the protective sheath, the filaments being oriented predominantly in the circumferential direction of the sheath, and boundary layers are interposed between confronting surfaces of any adjoining filament-embedded layers, the boundary layer being made of a material that is weaker in bonding power than the solid material of the filament-embedded layer.

2. A thermocouple lance for measuring temperatures in molten metals according to claim 1, wherein the temperature-measuring alloy wires are made of tungsten-rhenium.

3. A thermocouple lance for measuring temperatures in molten metals according to claim 1, wherein the layered structure of the protective sheath is made from the layers of a molybdenum matrix, and other layers of at least one selected from the class consisting of C, MgO, CaO, $Al_2O_3$ and $ZrO_2$, the filler is of porous heat-resisting ceramics, and the protective sheath is closed at its open end by means of a sealing plug composed of dense heat-resisting substance and glass.

4. A thermocouple lance for measuring temperatures in molten metals according to claim 3, wherein at least the outermost shell layer of the protective sheath is made of a cermet layer composed of any one of Mo—ZrN, Mo—$ZrB_2$, Mo—$ZrO_2$, Mo—ZrC and composite thereof, which has a low coefficient of thermal expansion and is unsusceptible to the reaction with the molten metals.

5. A thermocouple lance for measuring temperatures in molten metals according to claim 3, wherein the filler of porous heat resisting ceramics is composed of reaction-sintered silicon nitride with the addition of Ti.

6. A thermocouple lance for measuring temperatures in molten metals according to claim 3, wherein the filler of porous heat resisting ceramics is composed of a mixture of heat resisting ceramic powder and inorganic substance converted from organosilicon polymer containing therein $Si_3N_4$ powder.

7. A thermocouple lance for measuring temperatures in molten metals according to claim 6, wherein the mixture contains therein at least one of carbon and boron nitride (BN).

8. A thermocouple lance for measuring temperatures in molten metals according to claim 3, wherein the filler of porous heat resisting ceramics contains Zr, O, Al and P.

9. A thermocouple lance for measuring temperatures in molten metals according to claim 1, wherein the layers of the protective sheath are each composed of any one of ceramics and a composition of ceramics and carbon.

10. A thermocouple lance for measuring temperatures in molten metals according to claim 1, wherein the layers of the protective sheath are each made of cermet that is composed of ceramics and a metal of any one of Mo and W.

11. A thermocouple lance for measuring temperatures in molten metals according to claim 1, wherein the filaments oriented in the layers of the protective sheath are of any one of carbon filaments and ceramic filaments.

12. A thermocouple lance for measuring temperatures in molten metals according to claim 11, wherein the carbon filaments are coated with at least any one of Mg, CaO, $ZrO_2$ and $Al_2O_3$.

13. A thermocouple lance for measuring temperatures in molten metals according to claim 1, wherein the boundary layers are each composed of any one of carbon and boron nitride (BN).

* * * * *